US009899655B2

(12) United States Patent
Dai

(10) Patent No.: US 9,899,655 B2
(45) Date of Patent: Feb. 20, 2018

(54) ELECTROCHEMICAL CURRENT COLLECTOR SCREEN DESIGNS UTILIZING ULTRASONIC WELDING

(71) Applicant: Greatbatch Ltd., Clarence, NY (US)

(72) Inventor: Xiangyang Dai, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 15/016,988

(22) Filed: Feb. 5, 2016

(65) Prior Publication Data

US 2016/0155996 A1 Jun. 2, 2016

Related U.S. Application Data

(63) Continuation-in-part of application No. 14/028,324, filed on Sep. 16, 2013, now abandoned.
(Continued)

(51) Int. Cl.
*H01M 2/26* (2006.01)
*H01M 2/30* (2006.01)
(Continued)

(52) U.S. Cl.
CPC ........... *H01M 2/263* (2013.01); *H01M 2/065* (2013.01); *H01M 2/22* (2013.01); *H01M 2/30* (2013.01); *H01M 4/661* (2013.01); *H01M 4/70* (2013.01); *H01M 4/662* (2013.01); *H01M 6/14* (2013.01); *H01M 10/052* (2013.01); *H01M 2220/30* (2013.01)

(58) Field of Classification Search
CPC ........ H01M 2/263; H01M 2/30; H01M 2/065; H01M 2/22; H01M 4/661; H01M 4/70; H01M 2220/30; H01M 4/662; H01M 10/052; H01M 6/14
See application file for complete search history.

(56) References Cited

U.S. PATENT DOCUMENTS 4,310,609 A 1/1982 Liang et al.
4,391,729 A 7/1983 Liang et al.
(Continued)

FOREIGN PATENT DOCUMENTS

EP 1067987 EP 8/2008

*Primary Examiner* — Miriam Stagg
*Assistant Examiner* — Carmen Lyles-Irving
(74) *Attorney, Agent, or Firm* — Steven W. Winn; Michael F. Scalise

(57) ABSTRACT

An electrochemical cell comprising an electrode assembly having a plurality of cathodes in which the plurality of cathodes is electrically connected together at a connection tab junction is disclosed. The junction preferably comprises a plurality of cathode connection tabs that are folded over each other to construct a junction that is mechanically and electrically robust. The junction is comprised of a plurality of connection tabs that each extend from a cathode. Each of the respective tabs is folded over each other to form a compact electrode junction having redundant connections. An elongated lead extends from the junction to provide an electrical connection to the plurality of cathodes. The junction is welded together such as by a laser, resistance or ultrasonic weld joint. The cathode junction is suitable for either primary or secondary cells, particularly those powering implantable biomedical devices.

32 Claims, 12 Drawing Sheets

Related U.S. Application Data

(60) Provisional application No. 61/701,283, filed on Sep. 14, 2012.

(51) Int. Cl.
*H01M 2/06* (2006.01)
*H01M 2/22* (2006.01)
*H01M 4/66* (2006.01)
*H01M 4/70* (2006.01)
*H01M 10/052* (2010.01)
*H01M 6/14* (2006.01)

(56) References Cited

U.S. PATENT DOCUMENTS

| | | | |
|---|---|---|---|
| 4,964,877 A * | 10/1990 | Keister | A61N 1/378 |
| | | | 29/623.1 |
| 5,250,373 A | 10/1993 | Muffoletto et al. | |
| 5,472,810 A | 12/1995 | Takeuchi et al. | |
| 5,516,340 A | 5/1996 | Takeuchi et al. | |
| 5,716,735 A | 2/1998 | Muffoletto et al. | |
| 6,245,464 B1 | 6/2001 | Spillman et al. | |
| 6,797,019 B2 | 9/2004 | Takeuchi et al. | |
| 7,081,142 B1 | 7/2006 | Carlson | |
| 2007/0254212 A1 | 11/2007 | Viavattine et al. | |
| 2007/0292761 A1 | 12/2007 | Park et al. | |
| 2010/0143773 A1 | 6/2010 | Honbou et al. | |
| 2010/0167118 A1 | 7/2010 | Liu et al. | |
| 2011/0104539 A1 | 5/2011 | Oh et al. | |
| 2012/0180309 A1 | 7/2012 | Berkowitz et al. | |

\* cited by examiner

ELECTROCHEMICAL CURRENT COLLECTOR SCREEN DESIGNS UTILIZING ULTRASONIC WELDING

CROSS-REFERENCE TO RELATED APPLICATION

This application is a continuation in part of U.S. patent application Ser. No. 14/028,324, filed Sep. 16, 2013, that claims priority from U.S. Provisional Patent Application Ser. No. 61/701,283, filed Sep. 14, 2012.

FIELD OF THE INVENTION

The present invention relates to the art of electrochemical cells, and more particularly, to various embodiments of electrode assembly constructions that connect multiple cathodes within an electrochemical cell.

PRIOR ART

The recent rapid development in small-sized electronic devices having various shape and size requirements requires comparably small-sized electrochemical cells of different designs that can be easily manufactured and used in these electronic devices. Preferably, the electrochemical cell has a high energy density. One commonly used cell configuration is a prismatic, case-negative cell design having an intermediate cathode flanked by opposed anode components in contact with the casing and in electrical association with the cathode.

The diverse variety of materials used in the construction of electrochemical cells increases the difficulty of assembling and manufacturing such small intricate devices. It is desirable to build such electrochemical cells with simplified procedures that create an electrochemical cell with a durable and robust construction. Such electrochemical cells require joining various internal components, composed of differing materials, with a strong durable bond. One of these critical connections is that of the current collector to the lead or terminal pin. As the name implies, the current collector gathers or collects the current that is generated within the electrochemical cell. The lead or terminal pin provides an electrical conduit from which electrochemical energy from within the cell is transferred external to the cell.

In the case of a primary electrochemical cell, the cell may comprise an anode current collector, a cathode current collector, or both. The anode or cathode primary cell current collector typically comprises a sheet of metal in the form of either a solid substrate, a mesh or a screen. In the case of a secondary cell, the inside surface of the case typically acts as the current collector.

However, because of the increasing cell size constraints, there is a need to minimize the number and the size of the components utilized to create electrical connections within the cell. That is while still providing robust connections. The present invention, therefore, provides various current collector embodiments that may utilize various configurations and weld connections. Specifically, embodiments which improve the connection between the current collector and a lead and/or a terminal pin are disclosed. In a preferred embodiment, the various current collector embodiments utilize an ultrasonic weld connection that minimizes the number and size of additional connection components.

In addition, the present application provides embodiments of various electrode assemblies. Of particular interest is the connection of the electrodes within an electrode assembly of an electrochemical cell. It is thus desirable that these electrical connections between electrodes, within the electrode assembly, are also mechanically robust to ensure a long lasting electrical connection that is able to withstand thermal expansion in addition to mechanical shock and vibration. This is particularly desirable for electrochemical cells that comprise multiple electrodes, such as multiple cathodes, that are electrically joined together. Furthermore, as cell sizes decrease and as different materials are utilized within cell constructions, it is desirable to have connection sub-assemblies that are compact in size, in addition to being resistant to thermal expansion and mechanical shock and vibration.

Additionally, the present invention enables the use of cost effective materials in the construction of electrochemical cells. Of particular interest is the current collector which can now be constructed from various cost effective materials such as aluminum. Furthermore, the ultrasonic welding process of the present invention is fast, simple, easy to control and effective.

SUMMARY OF THE INVENTION

The present invention relates to various designs of electrochemical cells. More specifically, the present invention relates to various designs of current collectors that are utilized in the construction of electrochemical cells. In addition, the present invention provides various current collector embodiments that are adaptable to the utilization of ultrasonic welding to join the current collector to a lead or terminal pin. The present invention further relates to methods of joining a lead or terminal pin to the current collector having different geometries and configurations that utilize ultrasonic welding techniques.

During the ultrasonic welding process, the applied ultrasonic energy imparts a friction between the surfaces of the two materials creating a solid-state bond therebetween. A mechanical force may also be simultaneously applied during the welding process that further enables joining of the two materials, i.e., the current collector and a terminal pin. After the vibrational energy is removed, a strong bond between the two materials is present. Prior art connections between the current collector and the terminal lead generally utilize a resistance weld or laser weld to connect the terminal pin/lead to the current collector. These prior art welding techniques usually require the use of an intermediary material that facilitates the connection therebetween. Resistance and laser welding techniques generally utilize heat to melt and join materials together. However, differences in material compositions and properties sometimes prohibit the formation of a robust and durable bond therebetween. The present invention, unlike the prior art, utilizes ultrasonic energy to join differing materials together. Therefore, other materials that have historically been difficult to join utilizing laser and resistance welding techniques are now more easily joined using ultrasonic welding.

In a preferred embodiment of the present invention, multiple current collectors are joined to a lead or terminal pin utilizing ultrasonic welding. Generally, a current collector is in electrical contact with the active material that comprises the anode, the active material that comprises the cathode, or both. The present invention can also be utilized in a variety of rechargeable or non-rechargeable electrochemical cell designs and chemistries in both case negative and case positive designs.

In an embodiment of the present invention, multiple electrodes, such as cathodes, are electrically connected together within an electrode assembly of an electrochemical cell. More specifically, the cathodes of the electrode assembly of the cell are joined together at a junction that comprises multiple connection tabs that outwardly extend from respective cathodes that comprise the assembly. In a preferred embodiment, this electrode connection is constructed by folding and welding the various tabs of the cathodes together in a compact junction. Thus, by folding the multiple connection tabs of the cathodes together, a compact and mechanically robust structure having redundant connection points is created. These redundant connections not only ensure a mechanically robust connection, but also ensure a robust electrical connection between the electrodes of the cell.

In a case negative design, the anode is electrically connected to the casing. In this particular example, the anode material is ultrasonically welded to a portion of an interior surface of the case. Alternatively, in a case positive design, the cathode is electrically connected to the casing. In this particular embodiment, the cathode material may be ultrasonically welded to a portion of the interior surface of the case. In either example, the casing may comprise a higher melting temperature material such as titanium, nickel, or stainless steel.

Thus, the present invention overcomes many inherent difficulties in constructing an electrochemical cell. The present invention reduces manufacturing cost and reduces construction complexity. Furthermore, the present invention provides for an electrochemical cell with a smaller, more compact size than is capable with some other cell designs.

DETAILED DESCRIPTION OF THE PREFERRED EMBODIMENTS

Figure 1:
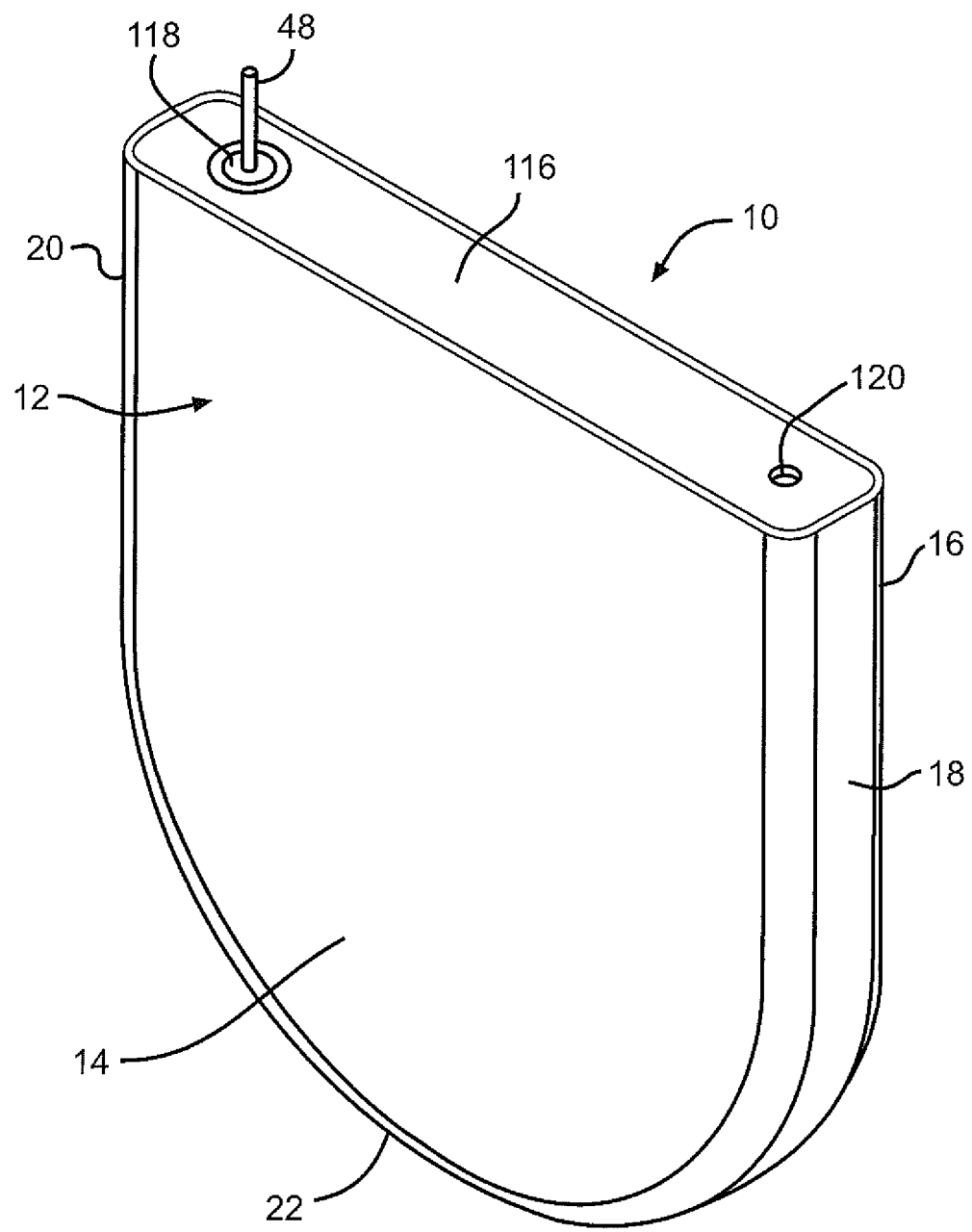
FIG. 1 is a perspective view of an embodiment of an electrochemical cell.
Figure 2:
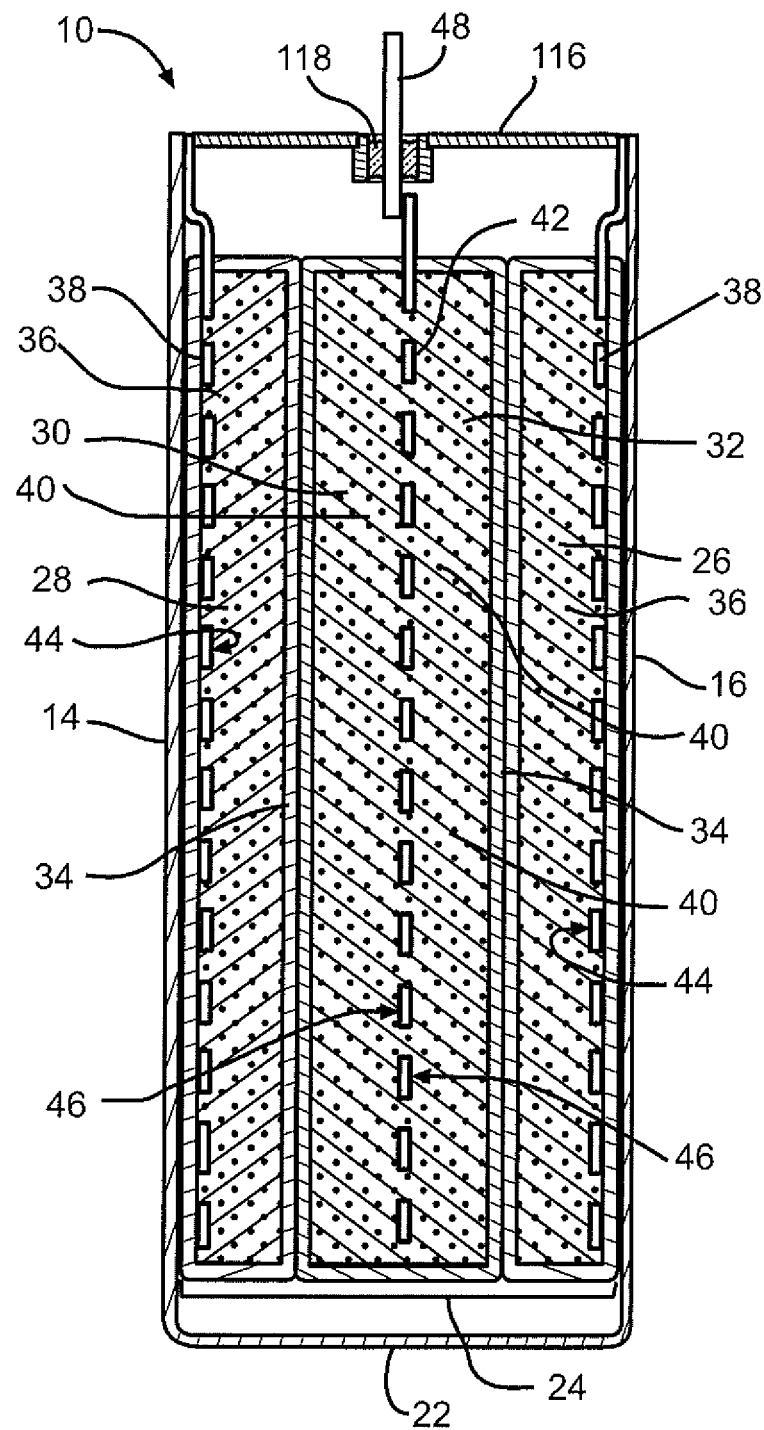
FIG. 2 is a cross-sectional view taken from the side illustrating the internal construction of the electrochemical cell shown in FIG. 1.

Referring now to FIGS. 1 and 2, there is shown an exemplary electrochemical cell 10 incorporating embodiments of the current collector of the present invention. As shown in the embodiment illustrated in FIG. 1, cell 10 comprises a casing 12 having spaced apart first and second side walls 14 and 16 extending to and meeting with opposed end walls 18 and 20 and a bottom wall 22. The end walls can be curved to provide the casing having an oval cross-section, or they can be generally planar to provide a rectangular cross-section. In perspective, electrochemical cell 10 of the illustrated embodiment is similar to the prismatic electrochemical described in U.S. Pat. No. 5,250,373 to Muffoletto et al.

Cell 10 comprises an electrode assembly 24 that further comprises anode components 26, 28 and cathode components 30, 32 prevented from contacting each other by a separator membrane 34. The anode components 26, 28 are composed of an anode active material 36 that is supported on an anode current collector 38. Similarly, the cathode components 30, 32 are composed of an active cathode material 40 that is supported on a cathode current collector 42. An active anode material 36, preferably composed of lithium, is joined to the anode current collector 38. More specifically, the lithium active anode material 36 may be pressed onto the anode current collector or, alternatively, may be welded to a surface 44 of the anode current collector 38 using an ultrasonic welding process as disclosed in U.S. patent application Ser. No. 13/346,409 to Dai which is assigned to the assignee of the present application.

Although lithium is the preferred material, lithium alloys such as lithium silver, lithium aluminum, lithium boron, lithium silver boron, carbon, and combinations thereof may also be used as active anode materials. Likewise, the active cathode material 40 is supported by a portion of a surface 46 of the cathode current collector 42. The cathode active material may be pressed to the surface 46 of the current collector 42 or alternatively, may also by welded to the surface 46 of the cathode current collector 42 using an ultrasonic welding process.

The embodiment shown in FIG. 2 is commonly referred to in the art as a case negative cell design. Case negative electrochemical cells are constructed with anode components 26, 28 that are electrically connected to casing 12 via the anode current collector 38 while the cathode electrode components 30, 32 are electrically connected to an electrically isolated terminal pin 48 via the cathode current collector 42. In a preferred embodiment, a proximal end of the terminal pin 48 is connected to the current collector 38, 42, and a distal end of the terminal pin 48, spaced from the proximal end, preferably extends outside the casing 12.

Alternatively, a case positive cell design may be constructed by reversing the connections. In other words, electrically isolated terminal pin 48 is connected to the anode components 26, 28 via the anode current collector 38 and the cathode components 30, 32 are connected to the casing 12 via the cathode current collector 42. Furthermore, a case neutral cell design may be constructed comprising two electrically isolated terminal pins 48. Each of the terminal pins 48 are connected to respective anode components 26, 28 and cathode components 30, 32. The various embodiments of the electrode assemblies 24 disclosed in the present application may be either of a case negative or case positive design.

Both the anode current collector 38 and the cathode current collector 42 are composed of an electrically conductive material. In a preferred embodiment, the anode current collector 38 or the cathode current collector 42 may be composed of a material comprising titanium, aluminum, stainless steel, nickel, their associated alloys, and mixtures thereof. Furthermore, it is contemplated that either current collector 38, 42 may be composed of stainless steel, tantalum, copper, platinum, gold, cobalt nickel alloys, highly alloyed ferritic stainless steel containing molybdenum and chromium, and nickel-, chromium- and molybdenum-containing alloys.

In a preferred embodiment, the terminal pin 48 may be composed of aluminum, molybdenum, tantalum, tungsten, and combinations thereof. Alternatively, terminal pin 48 may also be composed of titanium, aluminum, stainless steel, tantalum, copper, platinum, gold, cobalt nickel alloys, highly alloyed ferritic stainless steel containing molybdenum and chromium, and nickel-, chromium- and molybdenum-containing alloys.

It should be noted that the electrochemical cell 10 of the present invention as illustrated in FIGS. 1 and 2 can be of either a rechargeable (secondary) or non-rechargeable (primary) chemistry of a case negative or case positive design. The specific geometry and chemistry of the electrochemical cell 10 can be of a wide variety that meets the requirements of a particular primary and/or secondary cell application.

Figure 3:
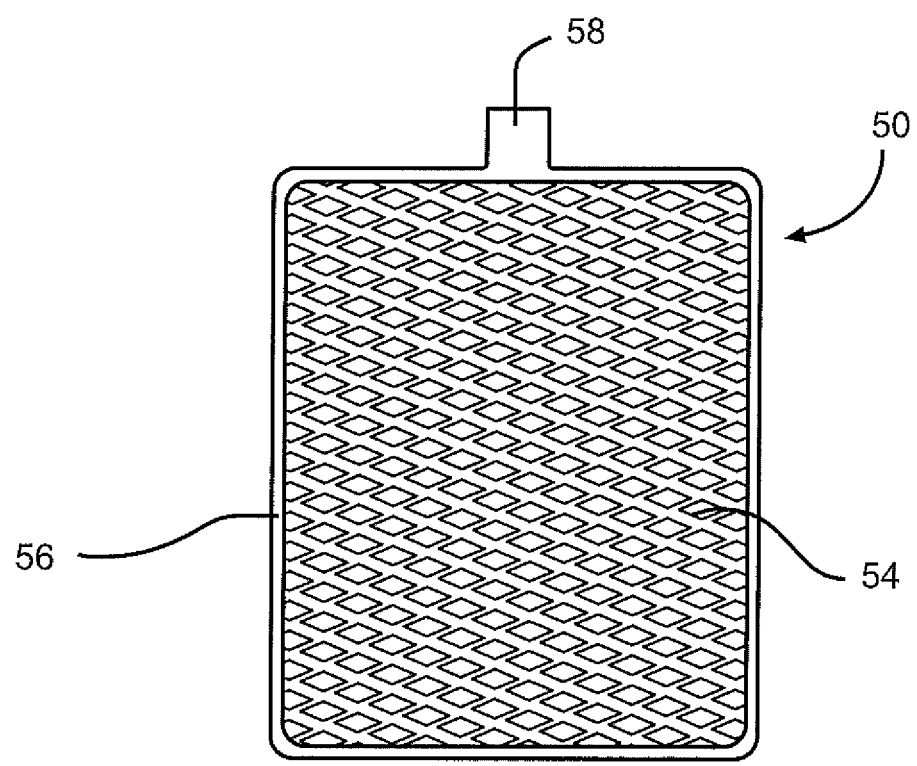
FIG. 3 is a side view of an embodiment of a single screen current collector of the present invention.
Figure 3A:
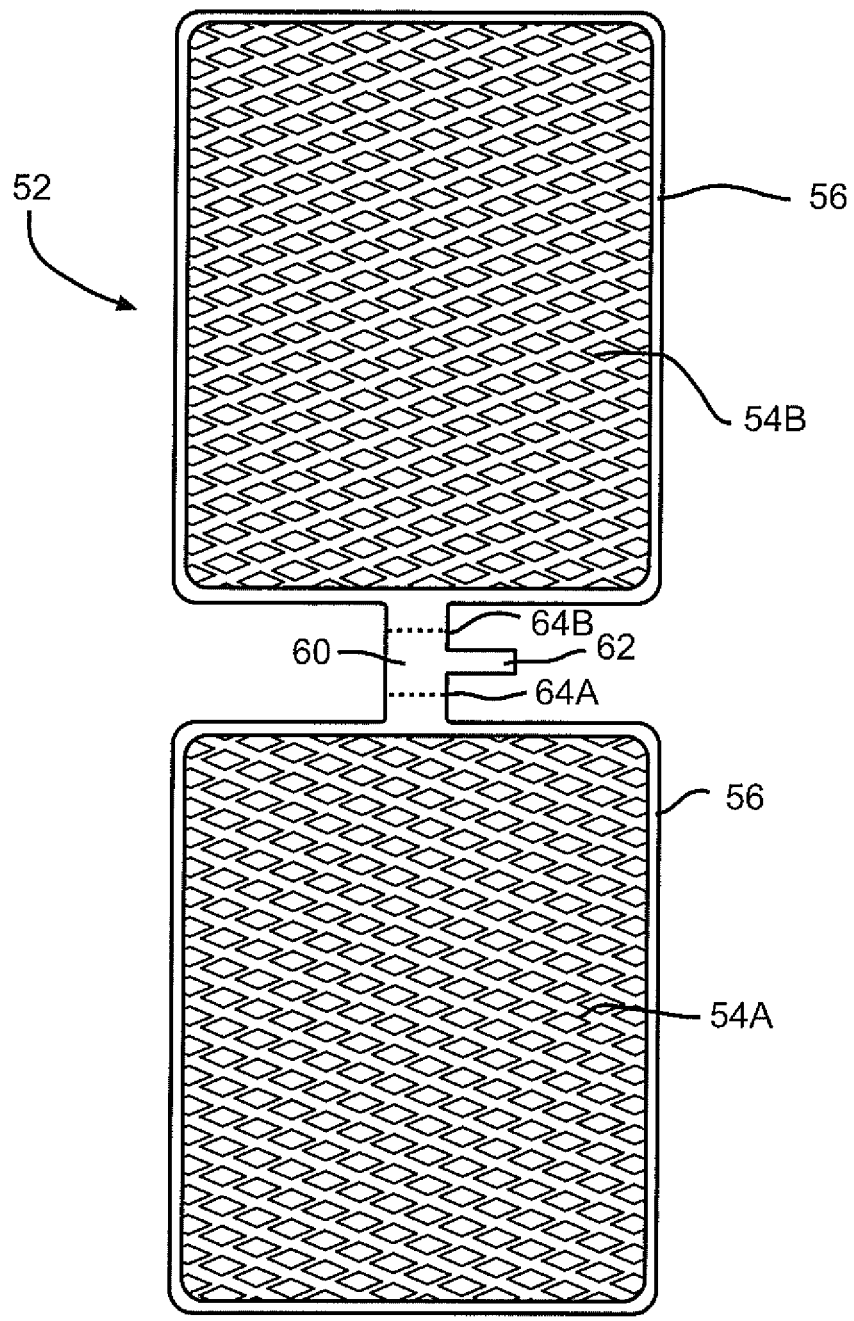
FIG. 3A is a side view of an embodiment of a bi-screen current collector of the present invention.

FIGS. 3 and 3A, illustrate embodiments of current collectors 50, 52 of the present invention. Both embodiments of current collectors 50, 52 may be used as anode or cathode current collectors 38, 42 supporting respective active anode and cathode active materials 36, 40 on its surfaces. As shown, current collectors 50, 52 generally comprise a screen portion 54 and a connection perimeter portion 56 that is co-planar with and surrounds the screen 54. As shown in FIG. 3, the current collector 50 comprises a connection tab 58 that extends outwardly from the connection perimeter portion 56. Preferably, the connection tab 58 is co-planar with the screen 54 and the connection perimeter 56. More preferably, the connection tab 58 extends perpendicularly from the screen 54. It is noted that while screen 54 is illustrated in a rectangular shape, the shape of the screen may be of a multitude of shapes including but not limited to a square, a circle, a half circle, an oval, a triangle, or a generic curved shape.

FIG. 3A illustrates an alternate embodiment of a current collector 52. As shown, current collector 52 is a bi-screen current collector comprising two opposing screens 54A, 54B. A current collector bridge portion 60 extends between the opposing screens 54A, 54B electrically connecting the screens therebetween. As illustrated, a landing strip or connection tab 62 extends perpendicularly from the bridge portion 60. As will be discussed in a preferred embodiment, when constructed in an electrochemical cell 10, the bi-screen current collector 52 is positioned such that the bridge portion 60 is bent along fold axis 64A and 64B. In a preferred embodiment, fold axis 64A and 64B are positioned perpendicular to the length of the bridge 60 that spans between the two screens 54A and 54B. When positioned within respective adjacent cathodes, the bridge portion 60 is bent along these axes such that the opposing screens 54A, 54B are positioned facing each other and perpendicular to the bridge portion 60. Screen, as pertains to the present invention, is defined herein as a foil having a solid surface or of a mesh or grid having a series of perforations throughout its surface. The screen is designed such that the cathode or anode active material 40, 36 is supported thereto.

Figure 4A:
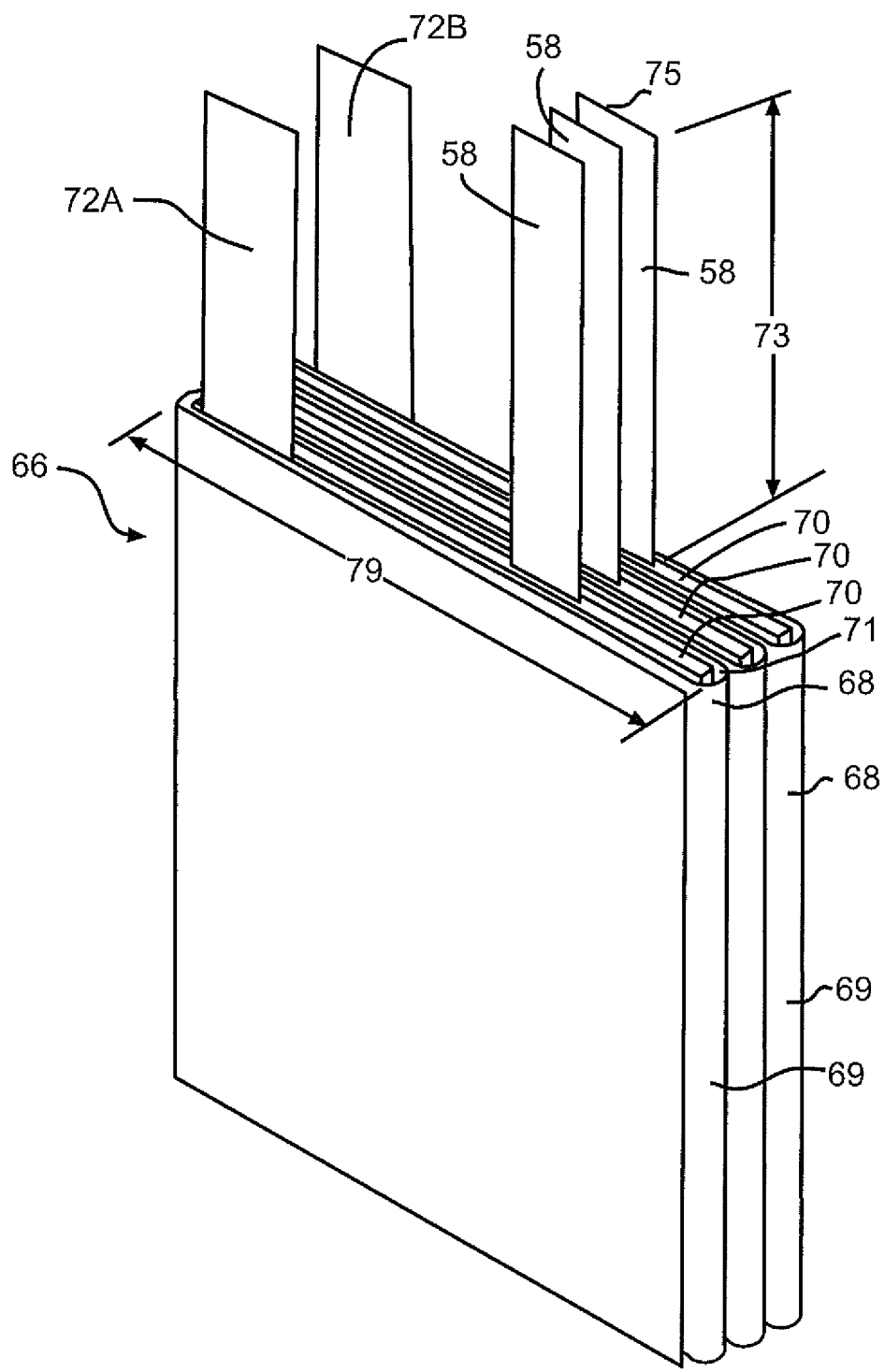
FIGS. 4A-4D illustrate various embodiments of a sequence of events in forming an electrode assembly of the present invention.
Figure 4B:
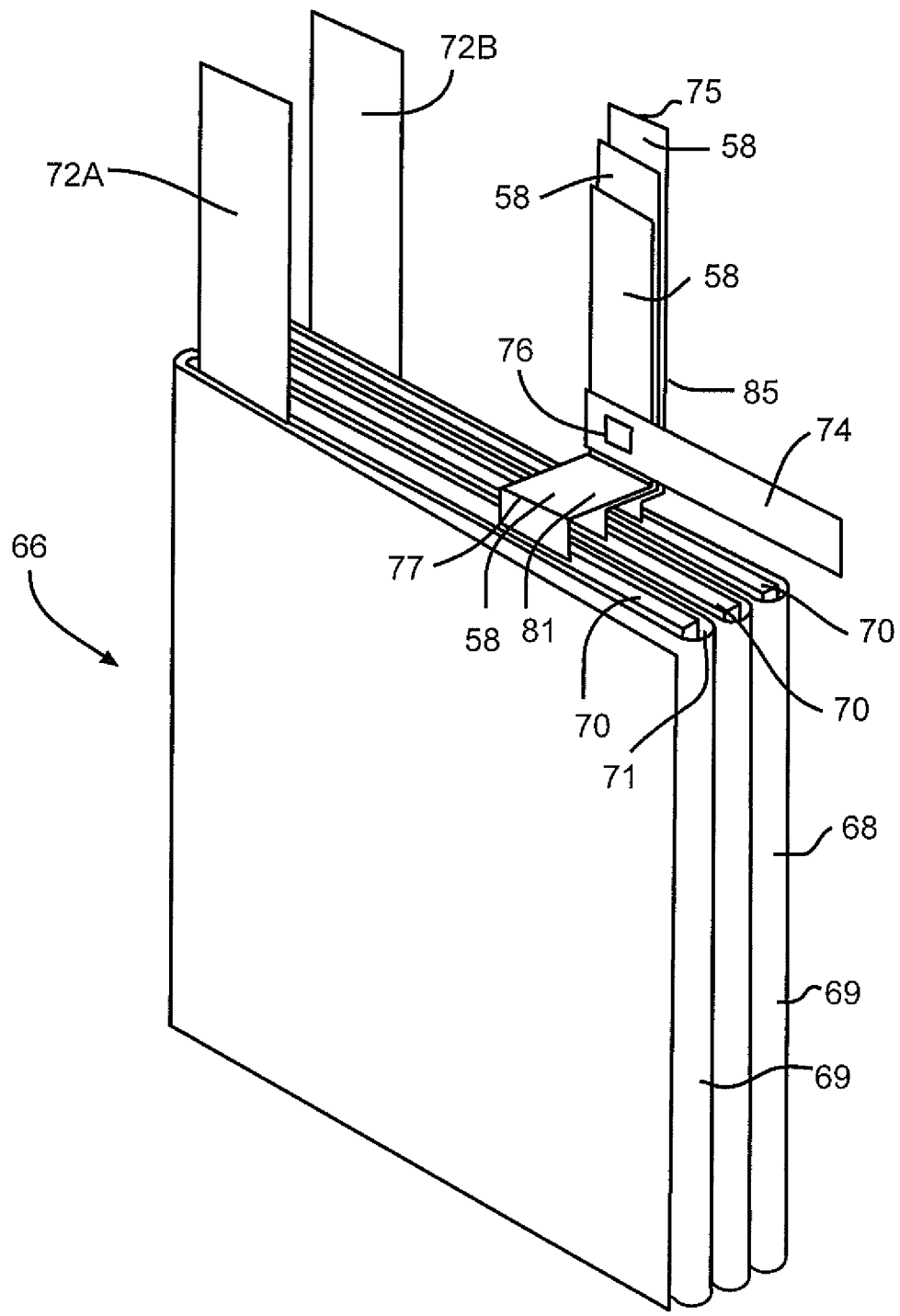

FIGS. 4A through 4D illustrate an embodiment of a sequence of steps that may be performed to construct an electrode assembly 66 of the present invention. As illustrated in FIG. 4A, an embodiment of the electrode assembly 66 is shown. As illustrated, the electrode assembly 66 comprises an anode 68 and a plurality of cathodes 70. As shown in FIGS. 4A through 4D, the anode is constructed having a serpentine-like shape with a series of folds 69 that each receive at least one of the plurality of cathodes 70. In a preferred embodiment, the series of spaced apart folds 69 are positioned along a length of the anode 68. These folds 69 are preferably oriented in alternating directions to thereby form the anode 68 in a serpentine orientation. In a preferred embodiment, each of the plurality of alternating folds 69 define a slot 71 within which at least one of the plurality of cathodes 70 is positioned. As illustrated in FIGS. 4A-4D, the plurality of adjacently positioned cathodes 70 are positioned within the slot 71 formed by the respective folds 69 of the anode 68. In other words, the folds 69 of the serpentine-like shaped anode 68 weave around each of the plurality of adjacently positioned cathodes 70.

In a preferred embodiment, each of the cathodes 70 may comprise the single screen current collector 50 as shown in FIG. 3. As constructed, the electrode assembly 66 comprises a plurality of cathodes 70 each with the single screen current collector 50 embedded therewithin. Each of the plurality of cathodes 70 is preferably constructed with a connection tab 58 having a length 73 that extends outwardly from the cathode to a distal tab end 75. In addition, the anode 68 preferably comprises spaced apart first and second anode connection tabs 72A, 72B that outwardly extend from the anode 68. In a preferred embodiment, as shown in FIGS. 4A through 4D, the anode 68 may be constructed with a single screen current collector 50 embedded therewithin. The proximal ends of each of the first and second anode connection tabs 72A, 72B are preferably connected to the current collector 50 positioned within the anode 68.

Figure 4C:
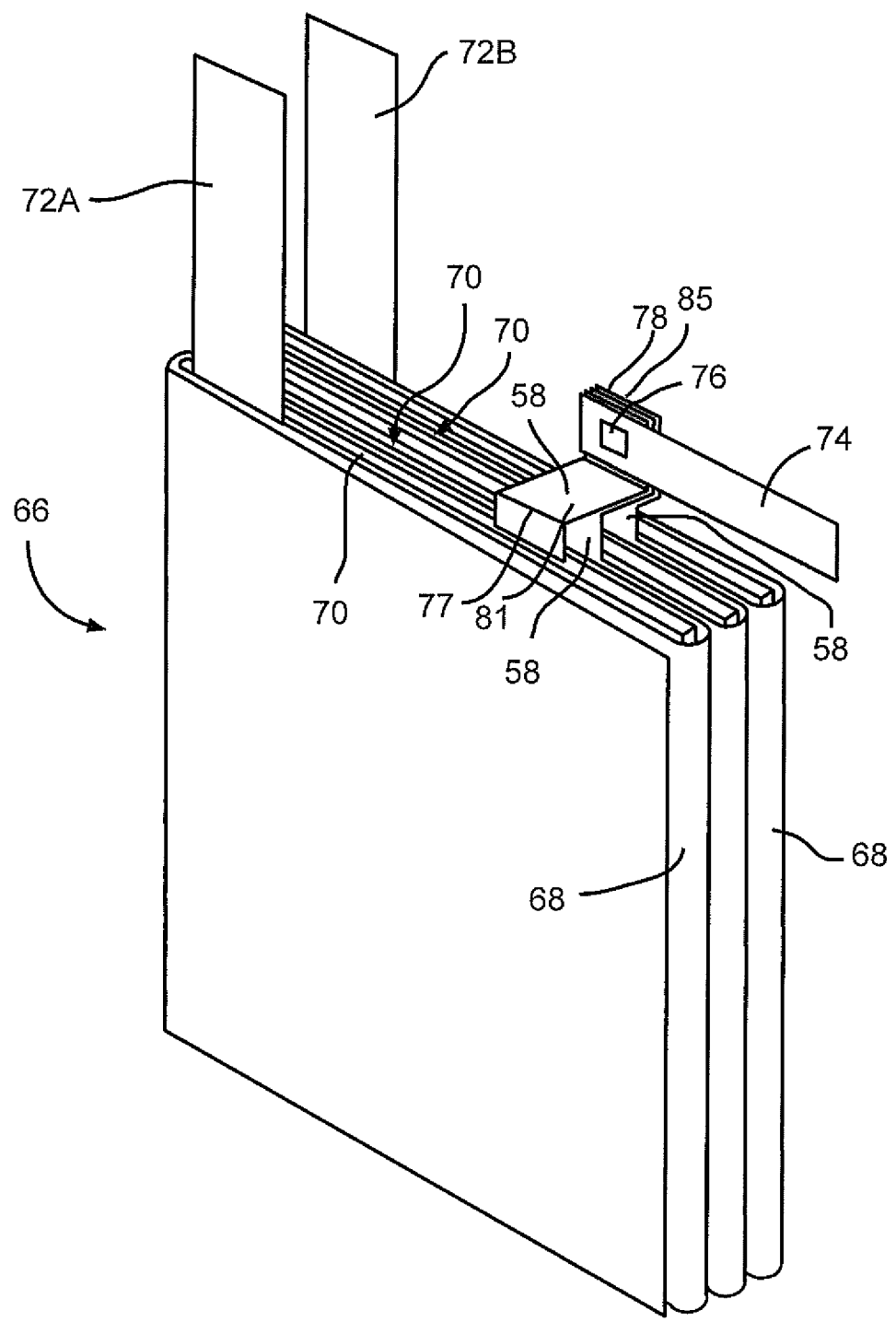
Figure 4D:
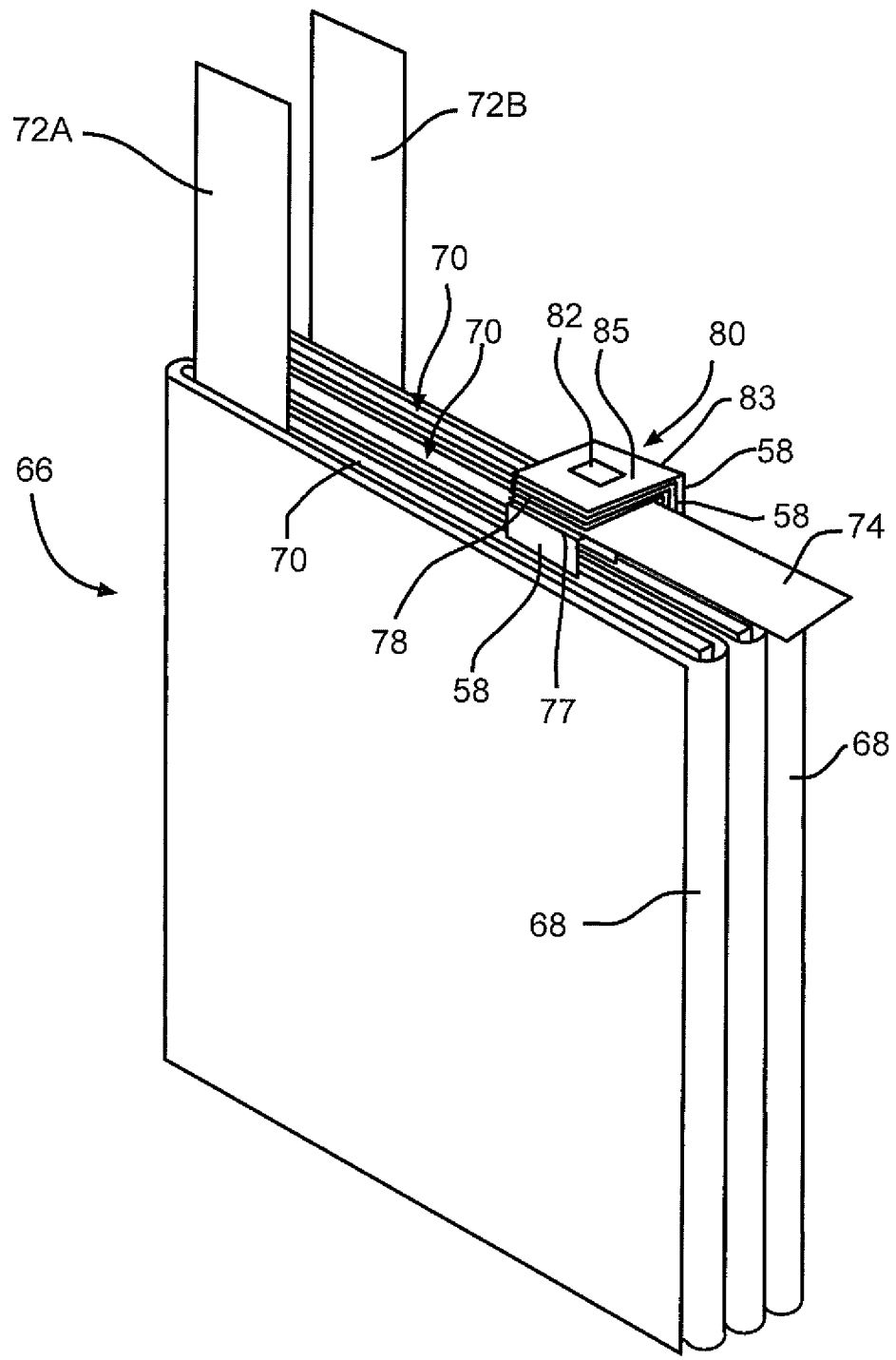

In an embodiment, after the electrode assembly 66 is constructed, the plurality of connection tabs 58 that extend from each of the cathodes 70 are folded over each other to construct a cathode connection tab junction 80 (FIG. 4D). In a preferred embodiment, a first fold 77 is created at a first position along the length of the connection tab 58 proximal to the respective cathode 70. In an embodiment, the crease of the first fold 77 extends about parallel to a width 79 of the cathode 70 such that the distal tab end 75 is oriented about perpendicular to the cathode width 79 and first fold 77 (FIG. 4A). As illustrated in the embodiment shown in FIGS. 4A-4C, a first tab portion 81 of the plurality of cathode tabs 58 extends distally away from the first fold 77. In addition, the first tab portion 81 is oriented about perpendicular to the first fold 77. A second fold 83 is positioned at a second, distal position from the first fold 77 along the length of the plurality of cathode tabs 58. As illustrated in the embodiment shown in FIG. 4D, a second tab portion 85 of the plurality of cathode tabs 58 extends distally away from the second fold 83. In addition, the second tab portion 85 is shown oriented about perpendicular to the second fold 83. In a preferred embodiment, the second tab portion 85 extends over the first tab portion 81 and towards the first fold 77. As illustrated in FIG. 4D, in a preferred embodiment, the first and second folds 77, 83 face each other but are at different elevations with the second fold 83 positioned above the first fold 77.

In addition, a lead 74 or terminal pin 48 (shown in FIGS. 1 and 2) is positioned in electrical contact with the folded connection tabs 58. For example, as illustrated in FIGS. 4C and 4D, the lead 74 may be positioned within the plurality of the folded connection tabs 58. Alternatively, the lead 74 may be electrically connected to the top of the junction 80. A first weld connection 76, such as a weld joint formed by an ultrasonic weld, a laser weld, or a resistance weld, is formed connecting the plurality of folded tabs 58 to the lead 74 or terminal pin 48.

As shown in FIG. 4C, the excess lengths of tabs 58 are preferably cut off thereby creating a flush edge 78 with the side of the lead 74 or terminal pin 48. FIG. 4D illustrates an embodiment of the finalized electrode assembly 66. As shown, once the excess lengths of the tabs 58 are removed, the second portions 85 of the tabs 58 are then folded back over each of the first portions 81 of the tabs 58 to thereby create the cathode tab junction 80. In a preferred embodiment, the crease of the second fold 83, positioned distal of the first fold 77, extends about parallel to the width 79 of the cathode 70. The second fold 83 is preferably oriented such that the second tab portions 85 extend toward the first fold 77. A second weld joint 82 may then be formed connecting the overlapping first and second portions 81, 85 of the tabs 58 and the lead 48 or terminal pin 48.

While it is preferred that the first and second tab portions 81, 85 extend about perpendicular from their respective first and second folds 77, 83, it is contemplated that either or both of the first and second tab portions 81, 85 may be oriented at different angles with respect to their respective folds 77, 83. For example, either or both of the first and second tab portions 81, 85 may be oriented at an obtuse angle from their respective folds 77, 83. However, in either case, the cathode tab junction 80 is formed in which at least a portion of the first and second tab portions 81, 85 overlap and are in physical contact with each other. The electrode assembly 66 is then ready to be positioned within the case 12. In a preferred embodiment, at least one of the first and the second anode connection tabs 72A, 72B is positioned in electrical contact with an interior surface of the casing 12.

The structure of the cathode connection tab junction 80 ensures a mechanically robust connection of the plurality of cathodes 70 that comprise the cell 12. Thus, folding the connection tabs 58 of the respective cathodes 70 over each other provides a mechanically durable connection having redundant connections therebetween. For example, in the unlikely event that a connection tab may become detached from the junction 80, the other multiple folded over portions of the cathode connection tabs 58 that comprise the junction 80 ensure a continued durable mechanical and electrical connection of the cathodes 70 that comprise the electrode assembly 66. This structure, therefore, provides a mechanically durable connection that can withstand mechanical shock and vibration in addition to thermal expansion. In addition, constructing the junction 80 by folding the various cathode connection tabs 58 over each other conserves space within the electrode assembly and the cell casing. Therefore, even smaller electrochemical cell sizes are able to be constructed.

Prior art cells such as the cell disclosed in U.S. Pat. No. 5,716,735 to Muffoletto et al, which is incorporated herein by reference, utilize a traverse bar that is positioned across electrode leads. This prior art construction, unlike the embodiment of the present application, lacks the robust mechanical construction of the present embodiment. As disclosed in the '735 patent, there is only one point of contact for each electrode to the transverse bar that comprises the electrode assembly. Unlike the present embodiment shown in FIG. 4D, the traverse bar construction of the prior art lacks redundant connections that are achieved by overlapping the connection tabs 58. Therefore, if a portion of the transverse bar became detached from an electrode, electrical connection may be lost. Furthermore, the prior art transverse bar construction having multiple electrode connections that extend along the length of the bar occupies a greater amount of space in the cell casing than the present embodiment which comprises a compact junction of multiple folded over tabs 58.

It is noted that while it is preferred that electrode assembly 66 be constructed such that cathode plate 70 is positioned within the folds of anode 68, electrode assembly 66 may also be constructed in a plate-like form. More specifically, electrode assembly 66 may be constructed such that both the anode 68 and the cathode 70 comprise a plate-like shape positioned adjacent each other, such as illustrated in the electrode assembly embodiment 24 shown in FIG. 2.

As defined herein, a "lead" is a conductive body having two respective ends that facilitates the transfer of electrochemical energy along a length of the body from one end to the other. A lead may in the form of a wire, a flat tape, or other electrically conductive body. One end of the lead is electrically connected to the electrode assembly, particularly the cathode or anode current collector of the electrode assembly, and the other end is electrically connected to another location that may be internal or external of the electrochemical cell.

In a preferred embodiment, lead 74 may be composed of a material comprising titanium, aluminum, stainless steel, nickel, their associated alloys, and mixtures thereof. Furthermore, it is contemplated that the lead 74 may also be composed of stainless steel, tantalum, copper, platinum, gold, cobalt nickel alloys, highly alloyed ferritic stainless steel containing molybdenum and chromium, and nickel-, chromium- and molybdenum-containing alloys.

Figure 5:
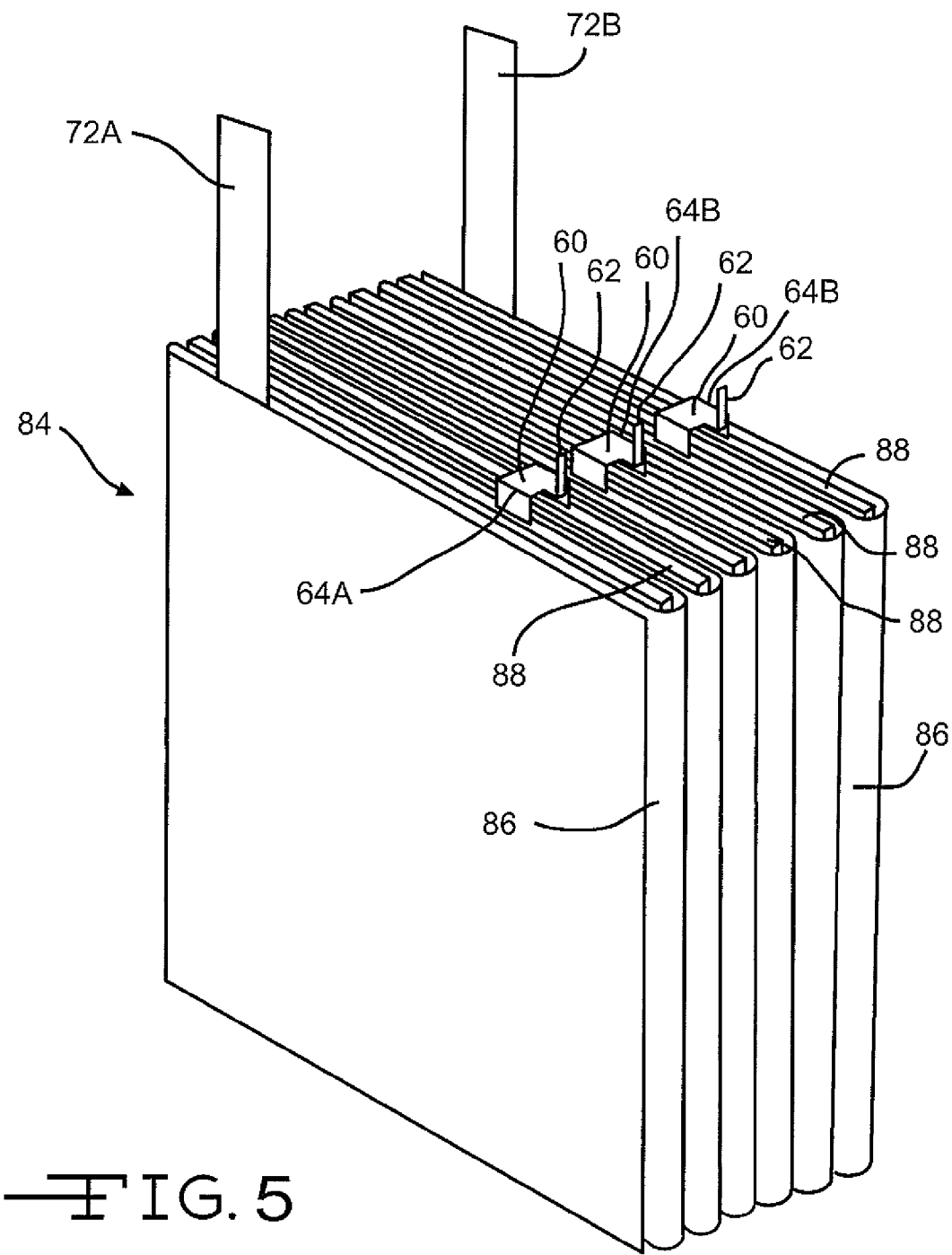
FIG. 5 is a perspective view of an alternate embodiment of an electrode assembly of the present invention.
Figure 5A:
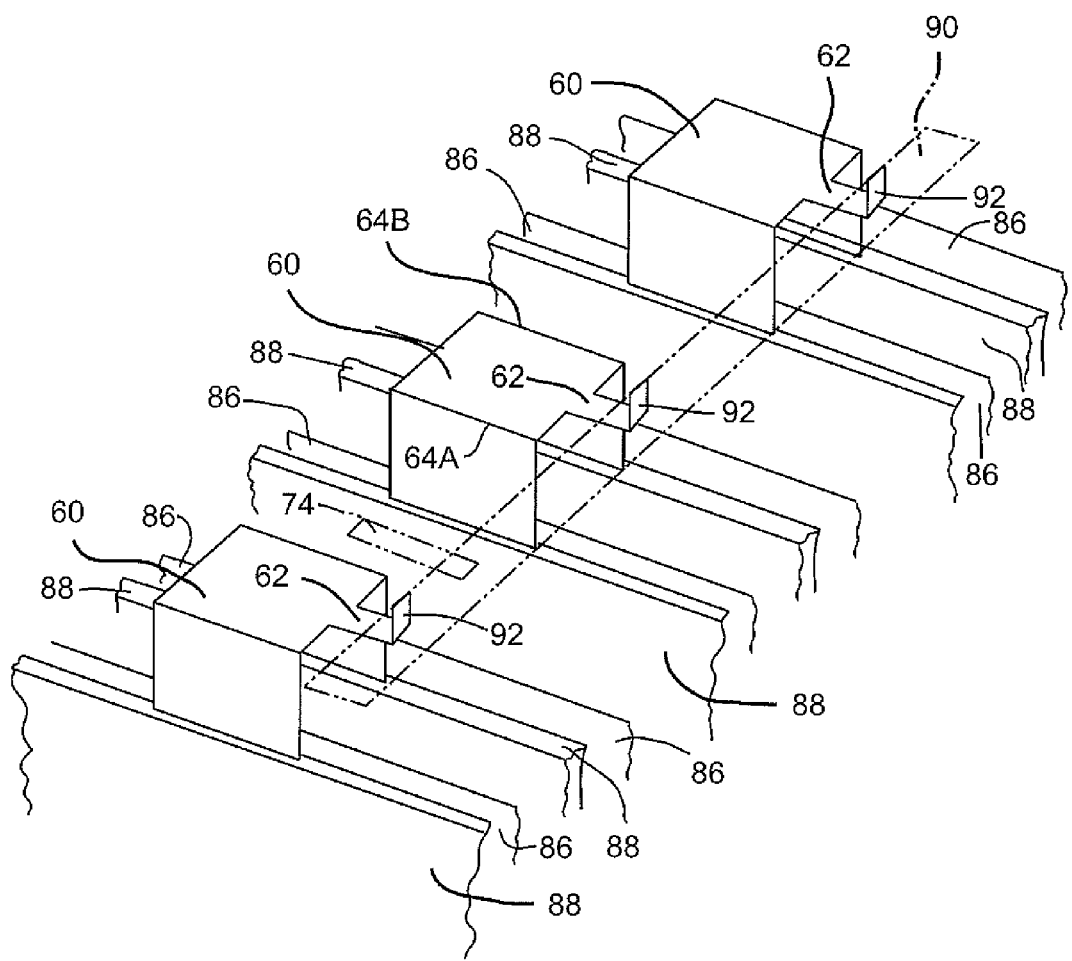
FIG. 5A illustrates a magnified perspective view of an embodiment of the electrode assembly shown in FIG. 5.

FIG. 5 illustrates an alternate embodiment of an electrode assembly 84. Like the electrode assembly embodiments 24, 66 previously described, electrode assembly 84 comprises an anode 86 and a cathode 88. However, unlike the previously described electrode assemblies 24 (FIG. 2) and 66 (FIGS. 4A-4D), electrode assembly 84 comprises the "bi-screen" current collector 52 previously shown in FIG. 3A. Similarly to the electrode assembly 66 shown in FIG. 4A, electrode assembly 84 preferably comprises an anode 86 formed in a serpentine orientation. A series of cathodes 88 are preferably positioned in between each of the folds of the anode 86. However, in this electrode assembly embodiment 84, the first and second screens 54A, 54B of the bi-screen current collector 52 (FIG. 3A) are positioned within adjacent cathode plates 88. As shown, an imaginary plane co-planar to the top surface the bridge portion 60 of the current collector 52 is positioned about perpendicular to a vertical axis of the cathode plates 88. As shown, the landing strip 62 extends outwardly from the bridge portion 60 of the current collector 52. In a preferred embodiment, a distal end of the landing strip 62 extends perpendicularly from the bridge portion 60 of the current collector 52. A proximal end of the landing strip 62 is preferably co-planar to the bridge portion 60 of the current collector 52. In a preferred embodiment, the landing strip 62 is designed to be bendable. As illustrated in FIGS. 5 and 5A, the landing strip 62 is illustrated as being bent at about a 90° angle with respect to the top surface of the bridge portion 60.

In an embodiment shown in FIG. 5A, a plate 90 may be positioned across the bent landing strips 62 thereby providing a surface with which to contact the lead(s) 74 or terminal pin(s) 48. In a preferred embodiment, the plate 90 may be ultrasonically welded to at least one of the landing strips 62. As shown an ultrasonic weld connection 92 connects the plate 90 to the landing strips 62. Alternatively, the plate 90 may be connected to the landing strips 62 using a different means such as a laser or resistance weld.

In a preferred embodiment, the plate 90 may be of a material comprising titanium, aluminum, stainless steel, nickel, their associated alloys, and mixtures thereof. Furthermore, it is contemplated that the plate 90 may also be composed of stainless steel, tantalum, copper, platinum, gold, cobalt nickel alloys, highly alloyed ferritic stainless steel containing molybdenum and chromium, and nickel-, chromium- and molybdenum-containing alloys.

Furthermore, while it is preferred that electrode assembly 84 be constructed such that cathode plate 88 is positioned within the folds of anode 86, electrode assembly 84 may also be constructed in a plate-like form. More specifically, electrode assembly 84 may be constructed such that both the anode 86 and the cathode 88 comprise a plate-like shape that is positioned adjacent each other, such as illustrated in the electrode assembly embodiment 24 shown in FIG. 2.

Figure 6:
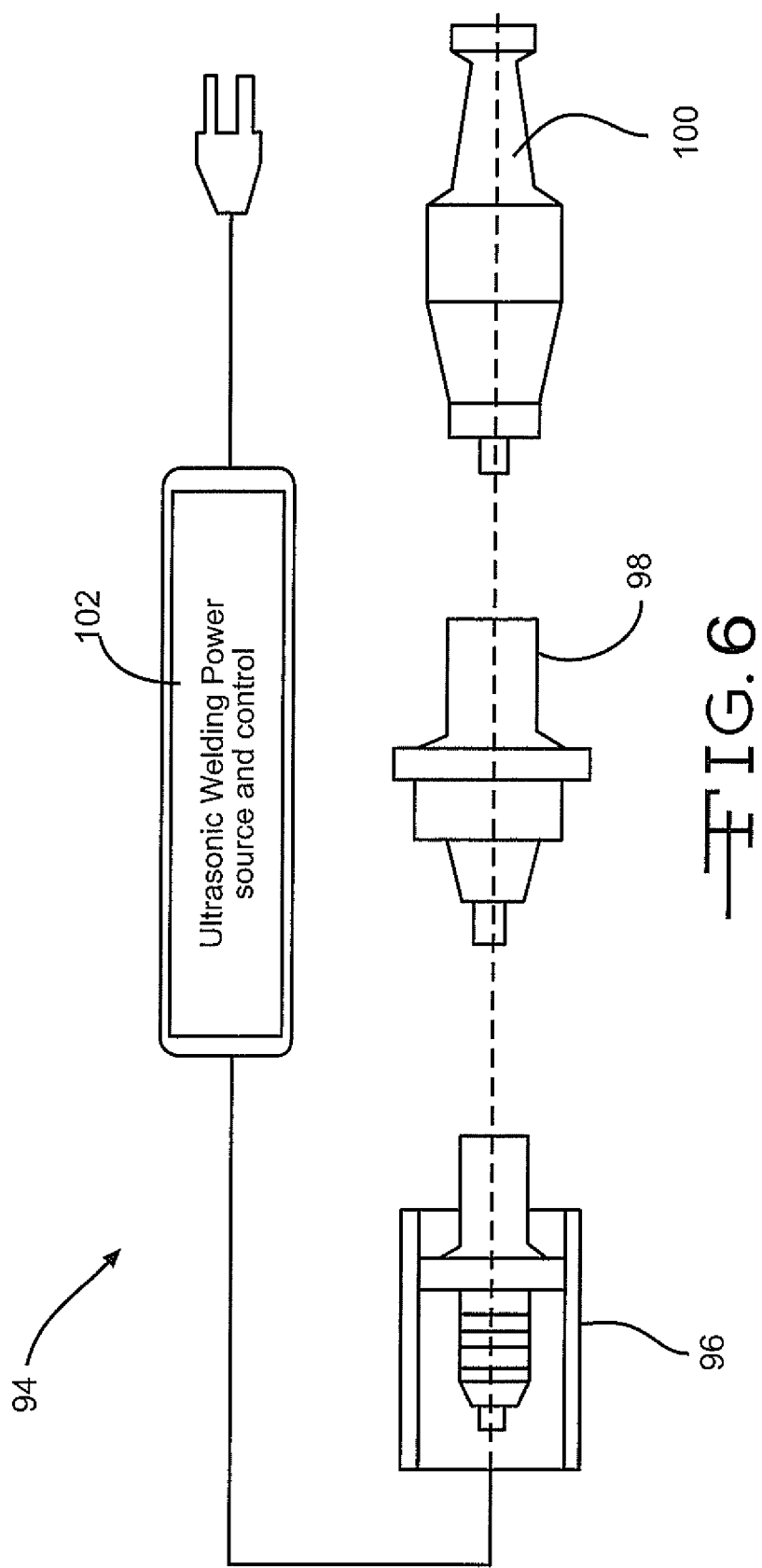
FIG. 6 is a side view illustrating an embodiment of the components of an ultra sonic welding apparatus.

Weld connections 76, 82 and 92 are preferably established through the use of an ultrasonic welding apparatus 94 illustrated in FIG. 6. As illustrated, the ultrasonic welder 94 comprises a transducer portion 96, a booster portion 98, and a horn portion 100. The ultrasonic welder 94 is connected to a power source 102 such as an electrical power source.

Figure 7A:
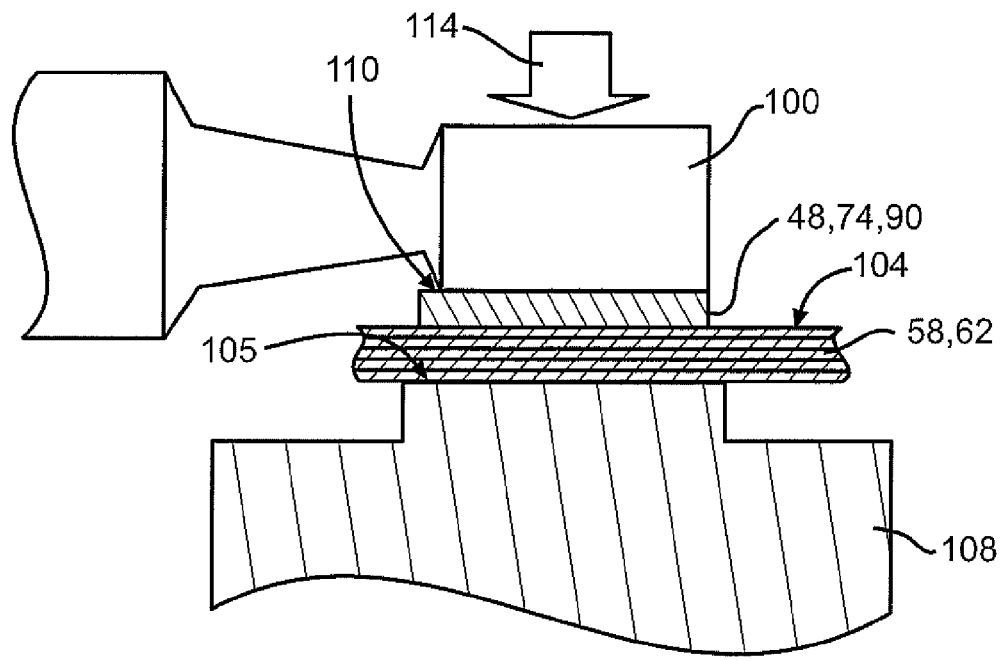
FIGS. 7A and 7B illustrate partial cross-section side views depicting an embodiment of the present invention of a terminal pin, lead or plate being joined a connection tab or landing strip of a current collector.
Figure 7B:
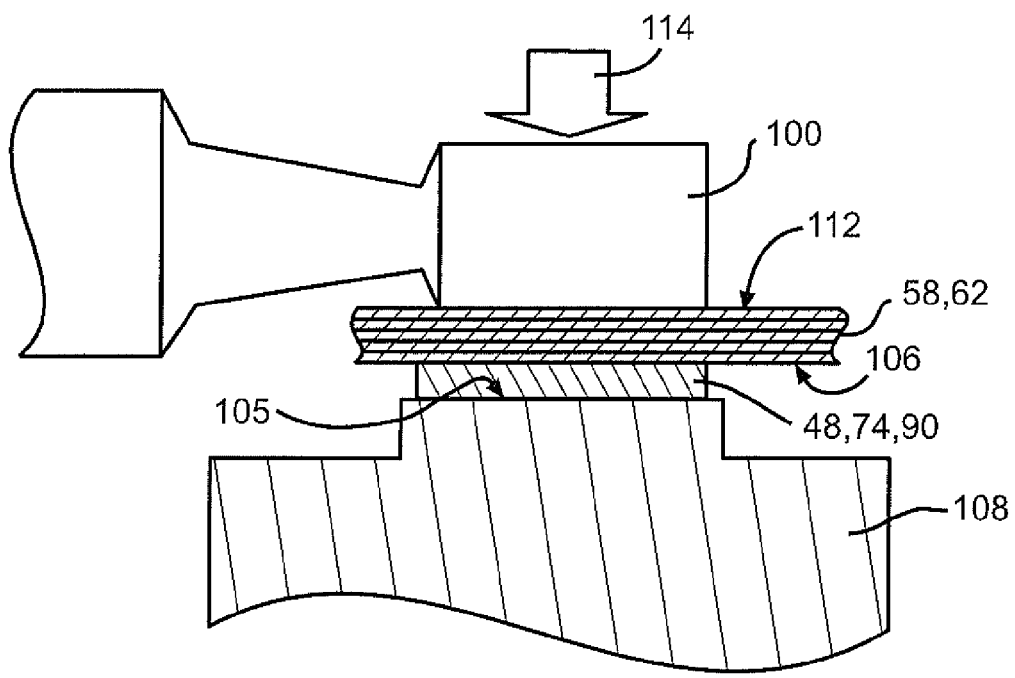

In operation, as shown in the embodiment of FIGS. 7A and 7B, a portion of the terminal pin 48 or lead 74 or plate 90 is placed on a portion of the current collector 50, 52. More specifically, as illustrated in FIG. 7A, a portion of the terminal pin 48, lead 74 or plate 90 is placed on a portion of a top surface 104 of the connection tabs 58 of current collector 50 or landing strips 62 of current collector 52. Alternatively, as shown in FIG. 7B, the terminal pin 48, lead 74 or plate 90 may be positioned such that it contacts a bottom surface 106 of the connection tabs 58 of current collector 50 or landing strips 62 of current collector 52. The combination of either the terminal pin 48, lead 74 or plate 90 and connection tab 58 or landing strip 62 is positioned on a hard surface such as that of a top surface 105 of an anvil 108.

Once the ultrasonic welder 94 is energized, the horn portion 100 of the welder 94 is placed in contact with a top surface 110 comprising the terminal pin 48, lead 74 or plate 90 as illustrated in FIG. 7A. Alternatively, as shown in FIG. 7B, the horn 100 of the ultrasonic welder instrument 94 is placed in contact with a top surface 112 of either of the connection tab 58 of current collector 50 or landing strip 62 of current collector 52. In either case, the oscillation of the horn portion 100 imparts friction between the top and bottom layers that are to be welded together. The friction created between the top and bottom layers, i.e., that of the terminal pin 48, lead 74 or plate 90 and the surface of the connection tab 58 or landing strip 62 as shown in FIG. 7A or that of the connection tab 58 or landing strip 62 and terminal pin 48, lead 74 or plate 90 as shown in FIG. 7B, initially cleans the respective surfaces.

Continued application of the oscillating horn portion 100 imparts a frictional energy that generates a solid-state bond between the layers of material at the weld interface. In a preferred embodiment, the ultrasonic welder 94 is energized to a welding energy output that ranges from about 1 joule to about 100 joules. In addition, when energized, the horn portion 100 preferably oscillates at a frequency ranging from about 20 kHz to about 40 kHz. When energized, the horn portion 100 may have an amplitude that ranges from about 1 μm to about 50 μm. Amplitude is herein defined as the distance the horn 100 travels from an initial position to a second position when energized. In other words, amplitude is the lateral distance travelled by the horn 100 when it oscillates from an initial position to a second position that is lateral of the initial position.

A mechanical force 114 ranging from about 1 lb-force to about 100 lb-force may be applied to the horn portion 100 of the ultrasonic welder 94 in a downward direction against the anvil 108. The mechanical force 114 is preferably applied while the ultrasonic welder 94 is energized. Application of the mechanical force preferably keeps the layers of material in close contact and helps encourage the weld joint therebetween.

As previously mentioned, the present invention is applicable to either primary or secondary electrochemical cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil.

The active cathode material 40 of a primary cell is of electrically conductive material, preferably a solid material. In a preferred embodiment, the active cathode material 40 may be of a sheet or foil form. Furthermore, the cathode material 40 may comprise a metal element, a metal oxide, a mixed metal oxide and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell, the cathode active material is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The cathode component 30, 32 may be prepared by rolling, spreading or pressing such that it is generally of a sheet or foil form. The cathode electrode material 40 may be pressed onto the surface of the cathode current collector 42 or alternatively, the cathode electrode material may be welded to the surface of the cathode current collector 42. The cathode material may also be prepared in the form of a strip wound with a corresponding strip of anode material in a structure similar to a "jellyroll" or a flat-folded electrode stack.

In order to prevent internal short circuit conditions, the cathode 30, 32 is separated from the anode 26, 28 by the separator membrane 34. The separator membrane 34 is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8 M to 1.5 M $LiAsF_6$ or $LiPF_6$ dissolved in a 50:50 mixture, by volume, of PC as the preferred high permittivity solvent and DME as the preferred low viscosity solvent.

By way of example, in an illustrative case negative primary cell, the active material of cathode body is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In secondary electrochemical systems, the anode 26, 28 comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of carbon, fibers of the carbonaceous material are particularly advantageous because they have excellent mechanical properties that permit them to be fabricated into rigid electrodes capable of withstanding degradation during repeated charge/discharge cycling.

The cathode 30, 32 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The lithiated active material is preferably mixed with a conductive additive selected from acetylene black, carbon black, graphite, and powdered metals of nickel, aluminum, titanium and stainless steel. The electrode further comprises a fluoro-resin binder, preferably in a powder form, such as PTFE, PVDF, ETFE, polyamides and polyimides, and mixtures thereof.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

The casing header comprises a metallic lid 116 (FIGS. 1 and 2) having an opening to accommodate a glass-to-metal seal 118 and terminal pin feedthrough 48 for the cathode. An additional opening 120 is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto.

Now, it is therefore apparent that the present invention has many features among which are reduced manufacturing cost and construction complexity. While embodiments of the present invention have been described in detail, it is for the purpose of illustration, not limitation.

What is claimed is:

1. An electrochemical cell, comprising:
   a) a casing;
   b) an electrode assembly contained within the casing, the electrode assembly comprising:
      i) at least a first cathode and a second cathode, the first cathode comprising a first cathode active material contacted to a first cathode current collector, and the second cathode comprising a second cathode active material contacted to a second cathode current collector, wherein:
         A) the first cathode current collector comprises a first perimeter having a first cathode tab extending outwardly therefrom, the first cathode tab extending from a first cathode tab distal portion to a first cathode tab proximal portion having a first cathode tab proximal end connected to the first cathode current collector perimeter; and
         B) the second cathode current collector comprises a second perimeter having a second cathode tab extending outwardly therefrom, the second cathode tab extending from a second cathode tab distal portion to a second cathode tab proximal portion having a second cathode tab proximal end connected to the second cathode current collector perimeter,
         C) wherein the first and second cathode tabs each have a first fold so that with the first and second cathodes in a side-by-side arrangement, the first cathode tab lays upon and contacts the second cathode tab;
         D) a cathode lead extending from a cathode lead proximal portion to a cathode lead distal portion, wherein the cathode lead proximal portion is contacted to the first cathode tab on an opposite side thereof with respect to its contact with the second cathode tab, and
         E) wherein the first and second cathode tabs each have a second fold so that the first cathode tab distal portion lays upon and contacts the cathode lead proximal portion residing between and contacting the first cathode tab proximal and distal portions, and with the second cathode tab distal portion laying upon and contacting the first cathode tab distal portion;

ii) at least one anode comprising an anode active material contacted to an anode current collector, wherein an anode tab extending outwardly from the anode current collector is connected to the casing serving as a negative terminal for the cell, and
iii) wherein the at least one anode is positioned between the side-by-side first and second cathodes; and
iv) a separator residing between the anode and the first and second cathodes; and
c) a feedthrough comprising a terminal pin of a glass-to-metal seal supported by the casing, wherein the terminal pin extends from a terminal pin proximal end electrically connected to the cathode lead distal portion to a terminal pin distal end located outside the casing to thereby serve as a positive terminal for the cell; and
d) an electrolyte contained within the casing to activate the electrode assembly.

2. The electrochemical cell of claim 1 wherein the first and second cathode current collectors comprise respective first and second cathode screens surrounded by the first and second cathode current collector perimeters, and wherein the first and second cathode active materials contact at least the respective first and second cathode current collector screens.

3. The electrochemical cell of claim 1 wherein the electrode assembly further comprises at least a third cathode, and the anode is formed in a serpentine-like shape that weaves between the first, second and third cathodes.

4. The electrochemical cell of claim 1 wherein the anode current collector comprises an anode screen surrounded by an unperforated perimeter and the anode active material contacts at least the anode current collector screen.

5. The electrochemical cell of claim 1 wherein a first weld connects the cathode lead to the first and second cathode tabs adjacent to the respective second folds, and wherein a second weld connects the cathode lead to the first and second cathode tabs intermediate the first and second folds.

6. The electrochemical cell of claim 1 wherein the anode active material is selected from the group consisting of lithium, lithium silver, lithium aluminum, lithium boron, lithium silver boron, carbon, and combinations thereof.

7. The electrochemical cell of claim 1 wherein the first and second cathode current collectors and the anode current collector comprise a current collector material selected from the group consisting of titanium, aluminum, nickel, and stainless steel.

8. The electrochemical cell of claim 1 wherein the casing comprises a casing material selected from the group consisting of titanium, nickel, and stainless steel.

9. The electrochemical cell of claim 1 wherein the anode active material is lithium and the first and second cathode active materials are selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

10. The electrochemical cell of claim 1 wherein the anode active material is a carbonaceous material and the first and second cathode active materials are selected from the group consisting of $LiNiO_2$, $LiMn_2O_4$, $LiCoO_2$, $LiCo_{0.92}Sn_{0.08}O_2$, and lithium nickel cobalt oxide.

11. The electrochemical cell of claim 1 wherein the electrolyte comprises an ionically conductive salt dissolved in a nonaqueous solvent.

12. The electrochemical cell of claim 1 wherein the first and second cathodes are each of a plate-like structure.

13. The electrochemical cell of claim 1 wherein a weld joins:

i) the first cathode tab proximal portion to the second cathode tab proximal portion;
ii) the first cathode lead proximal portion to the first cathode tab proximal and distal portion, and
iii) the second cathode tab distal portion to the first cathode tab distal portion.

14. An electrochemical cell, comprising:
a) a casing of electrically conductive material;
b) an electrode assembly comprising first and second opposite polarity electrodes housed inside the casing in electrochemical association with each other, wherein there are at least three first polarity electrodes, each comprising:
  i) a first active material contacted to a first current collector, wherein a first tab extends outwardly from a perimeter of the first current collector, wherein each first tab extends from a first tab distal portion to a first tab proximal portion having a first tab proximal end residing at the current collector perimeter,
  ii) wherein each first tab of the at least three first electrodes has a first fold so that a first one of the first tabs lays upon and contacts a second one of the first tabs and the second one of the first tabs in turn lays upon and contacts a third one of the first tabs;
  iii) a first lead extending from a first lead proximal portion to a first lead distal portion, wherein the first lead proximal portion is contacted to the first one of the first tabs on an opposite side thereof with respect to the first tab's contact with the second one of the first tabs, and
  iv) wherein the first tabs of the at least three first electrodes have a second fold so that the first one of the first tabs lays upon and contacts the first lead proximal portion residing between and contacting the first one of the first tabs proximal and distal portions, and the second one of the first tabs lays upon and contacts the first one of the first tabs, and the third one of the first tabs in turn lays upon and contacts the second one of the first tabs;
c) an electrolyte activating the first and second electrodes;
d) the second electrode having a serpentine configuration that weaves between the at least three first polarity electrodes, wherein the second electrode comprises at least one a second electrode tab;
e) a feedthrough comprising a terminal pin of a glass-to-metal seal supported by the casing, wherein the terminal pin extends from a terminal pin proximal end electrically connected to one of the first lead and the second electrode tab to thereby serve as a terminal for the respective first or second electrode, and
f) wherein the other of the first lead and the second electrode tab not connected to the terminal pin is electrically connected to the casing serving as the opposite polarity terminal for the other of the first and second electrode.

15. The electrochemical cell of claim 14 wherein a first weld connects the first lead to the first tabs of the at least three first electrodes adjacent to the respective second folds, and wherein a second weld connects the cathode lead to the first tabs intermediate the first and second folds.

16. The electrochemical cell of claim 14 wherein the first active material is selected from the group consisting of lithium, lithium silver, lithium aluminum, lithium boron, lithium silver boron, carbon, and combinations thereof.

17. The electrochemical cell of claim 14 wherein at least one of the first current collector and the second electrode current collector is of a current collector material selected from the group consisting of titanium, aluminum, nickel, and stainless steel.

18. The electrochemical cell of claim 14 wherein the casing comprises a casing material selected from the group consisting of titanium, nickel, and stainless steel.

19. The electrochemical cell of claim 14 wherein the electrolyte comprises an ionically conductive salt dissolved in a nonaqueous solvent.

20. The electrochemical cell of claim 14 wherein the at least three first polarity electrodes are of a plate-like structure.

21. The electrochemical cell of claim 14 wherein a weld joins:
   i) each first tab proximal portion together;
   ii) the first cathode lead proximal portion to the proximal and distal portions of the first one of the first tabs of the at least three first electrodes, and
   iii) each first tab distal portion together.

22. An electrochemical cell, comprising:
   a) a casing;
   b) an electrode assembly contained within the casing, the electrode assembly comprising:
     i) at least a first cathode, a second cathode and a third cathode, the first cathode comprising a first cathode active material contacted to a first cathode current collector, the second cathode comprising a second cathode active material contacted to a second cathode current collector, and the third cathode comprising a third cathode active material contacted to a third cathode current collector, wherein:
       A) the first cathode current collector comprises a first perimeter having a first cathode tab extending outwardly therefrom, the first cathode tab extending from a first cathode tab distal portion to a first cathode tab proximal portion having a first cathode tab proximal end connected to the first cathode current collector perimeter;
       B) the second cathode current collector comprises a second perimeter having a second cathode tab extending outwardly therefrom, the second cathode tab extending from a second cathode tab distal portion to a second cathode tab proximal portion having a second cathode tab proximal end connected to the second cathode current collector perimeter; and
       C) the third cathode current collector comprises a third perimeter having a third cathode tab extending outwardly therefrom, the third cathode tab extending from a third cathode tab distal portion to a third cathode tab proximal portion having a third cathode tab proximal end connected to the third cathode current collector perimeter,
       D) wherein the first, second and third cathode tabs each have a first fold so that with the first, second and third cathodes in a side-by-side arrangement, the first cathode tab lays upon and contacts the second cathode tab, and the second cathode tab lays upon and contacts the third cathode tab;
       E) a cathode lead extending from a cathode lead proximal portion to a cathode lead distal portion, wherein the cathode lead proximal portion is contacted to the first cathode tab on an opposite side thereof with respect to its contact with the second cathode tab, and
       F) wherein the first, second and third cathode tabs each have a second fold so that the first cathode tab distal portion lays upon and contacts the cathode lead proximal portion residing between and contacting the first cathode tab proximal and distal portions, the second cathode tab distal portion lays upon and contacts the first cathode tab distal portion, and the third cathode tab distal portion lays upon and contacts the second cathode tab distal portion,
       G) wherein a first weld connects the cathode lead to the first, second and third cathode tabs adjacent to the respective second folds, and wherein a second weld connects the cathode lead to the first, second and third cathode tabs intermediate the first and second folds;
     ii) at least one anode comprising an anode active material contacted to an anode current collector, wherein an anode tab extending outwardly from the anode current collector is connected to the casing serving as a negative terminal for the cell, and
     iii) wherein the at least one anode is positioned between the first, second and third cathodes; and
     iv) a separator residing between the anode and the first, second and third cathodes; and
   c) a feedthrough comprising a terminal pin of a glass-to-metal seal supported by the casing, wherein the terminal pin extends from a terminal pin proximal end electrically connected to the cathode lead distal portion to a terminal pin distal end located outside the casing to thereby serve as a positive terminal for the cell; and
   d) an electrolyte contained within the casing to activate the electrode assembly.

23. The electrochemical cell of claim 22 wherein the first and second cathode current collectors comprise respective first and second cathode screens surrounded by the first and second cathode current collector perimeters, and wherein the first and second cathode active materials contact at least the respective first and second cathode current collector screens.

24. The electrochemical cell of claim 22 wherein the electrode assembly further comprises at least a third cathode, and the anode is formed in a serpentine-like shape that weaves between the first, second and third cathodes.

25. The electrochemical cell of claim 22 wherein the anode current collector comprises an anode screen surrounded by an unperforated perimeter and the anode active material contacts at least the anode current collector screen.

26. The electrochemical cell of claim 22 wherein the anode active material is selected from the group consisting of lithium, lithium silver, lithium aluminum, lithium boron, lithium silver boron, carbon, and combinations thereof.

27. The electrochemical cell of claim 22 wherein the first and second cathode current collectors and the anode current collector comprise a current collector material selected from the group consisting of titanium, aluminum, nickel, and stainless steel.

28. The electrochemical cell of claim 22 wherein the casing comprises a casing material selected from the group consisting of titanium, nickel, and stainless steel.

29. The electrochemical cell of claim 22 wherein the anode active material is lithium and the first and second cathode active materials are selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

30. The electrochemical cell of claim 22 wherein the anode active material is a carbonaceous material and the first and second cathode active materials are selected from the group consisting of $LiNiO_2$, $LiMn_2O_4$, $LiCoO_2$, $LiCo_{0.92}Sn_{0.08}O_2$, and lithium nickel cobalt oxide.

31. The electrochemical cell of claim 22 wherein the electrolyte comprises an ionically conductive salt dissolved in a nonaqueous solvent.

32. The electrochemical cell of claim 22 wherein the first and second cathodes are each of a plate-like structure.

* * * * *